United States Patent
Ono et al.

(10) Patent No.: US 11,202,000 B2
(45) Date of Patent: Dec. 14, 2021

(54) LEARNING APPARATUS, IMAGE GENERATION APPARATUS, LEARNING METHOD, IMAGE GENERATION METHOD, AND PROGRAM

(71) Applicant: Sony Interactive Entertainment Inc., Tokyo (JP)

(72) Inventors: Daichi Ono, Kanagawa (JP); Tsutomu Horikawa, Kanagawa (JP); Hirotaka Asayama, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/058,332

(22) PCT Filed: Jun. 18, 2018

(86) PCT No.: PCT/JP2018/023092
§ 371 (c)(1),
(2) Date: Nov. 24, 2020

(87) PCT Pub. No.: WO2019/244200
PCT Pub. Date: Dec. 26, 2019

(65) Prior Publication Data
US 2021/0218883 A1    Jul. 15, 2021

(51) Int. Cl.
*H04N 5/232*    (2006.01)
*H04N 5/225*    (2006.01)

(52) U.S. Cl.
CPC ....... *H04N 5/23222* (2013.01); *H04N 5/2258* (2013.01); *H04N 5/23238* (2013.01)

(58) Field of Classification Search
CPC ............. H04N 5/23222; H04N 5/2258; H04N 5/23238; H04N 5/232; G06N 3/04; G03B 15/00; G03B 37/00
See application file for complete search history.

(56) References Cited

U.S. PATENT DOCUMENTS

| | | | |
|---|---|---|---|
| 2017/0337470 A1* | 11/2017 | DeTone | G06T 3/403 |
| 2019/0122080 A1* | 4/2019 | Ichihashi | G06T 1/00 |
| 2020/0084413 A1* | 3/2020 | Lee | H04N 5/2257 |

FOREIGN PATENT DOCUMENTS

| | | |
|---|---|---|
| JP | 2017084422 A | 5/2017 |
| JP | 2017111620 A | 6/2017 |

OTHER PUBLICATIONS

International Preliminary Report on Patentability and Written Opinion for corresponding PCT Application No. PCT/JP2018/023092, 13 pages, dated Dec. 30, 2020.

(Continued)

*Primary Examiner* — Joseph W Becker
(74) *Attorney, Agent, or Firm* — Matthew B. Dernier, Esq.

(57) ABSTRACT

A learning input image acquisition section acquires a plurality of input images individually depicting a state imaged at a predetermined angle of view in a predetermined relative imaging direction. A learning wide angle-of-view image acquisition section acquires a wide angle-of-view image having an angle of view including all the angles of view of the plurality of input images. A learning section performs learning of a wide angle-of-view image generation section based on a learning wide angle-of-view image and an output that is generated when the plurality of input images are inputted to the wide angle-of-view image generation section, which generates and outputs an image having an angle of view including all the angles of view of a plurality of images in response to the input of the plurality of images.

9 Claims, 8 Drawing Sheets

(56) References Cited

OTHER PUBLICATIONS

International Search Report for corresponding PCT Application No. PCT/JP2018/023092, 3 pages, dated Aug. 21, 2018.

* cited by examiner

LEARNING APPARATUS, IMAGE GENERATION APPARATUS, LEARNING METHOD, IMAGE GENERATION METHOD, AND PROGRAM

TECHNICAL FIELD

The present invention relates to a learning apparatus, an image generation apparatus, a learning method, an image generation method, and a program.

BACKGROUND ART

Image-based lighting (IBL) is known as a technique that uses a light source set up based on live-action images to generate realistic computer graphics (CG) images or generate images by combining CG images with live-action images.

In order to improve the reality of generated images, it is preferable that the light source be set up based on wide angle-of-view images such as high dynamic range (HDR) 360-degree images, when the IBL technique is used. However, in order to obtain the wide angle-of-view images, it is necessary to capture images with special equipment such as an omnidirectional camera or a semi-omnidirectional camera and exercise technical expertise.

Accordingly, the wide angle-of-view images are generated by using an image generation section implemented based, for example, on a learned machine learning model instead of generating the wide angle-of-view images by capturing images. In this case, for example, images captured by a regular camera are inputted to the image generation section in order to generate the wide angle-of-view images that are supplemented with the results of estimation of environment outside the angle of view of the captured images such as objects and scenes outside the angle of view of the captured images.

SUMMARY

Technical Problems

In recent years, there exist a wide variety of smartphones and other imaging apparatuses having a plurality of cameras. The angle of view and relative imaging direction of each of these cameras are predetermined. Under these circumstances, it is expected that accurate wide angle-of-view images will be obtained with ease when wide angle-of-view images can be generated by inputting a plurality of images captured by the above imaging apparatus to the above-mentioned image generation section.

The present invention has been made in view of the above circumstances. An object of the present invention is to provide a learning apparatus, an image generation apparatus, a learning method, an image generation method, and a program that make it easy to obtain accurate wide angle-of-view images.

Solution to Problems

In order to solve the above problems, a learning apparatus according to the present invention includes an input image acquisition section, a wide angle-of-view image acquisition section, and a learning section. The input image acquisition section acquires a plurality of input images that individually depict a state imaged at a predetermined angle of view in a predetermined relative imaging direction. The wide angle-of-view image acquisition section acquires a wide angle-of-view image having an angle of view including all the angles of view of the plurality of input images. The learning section performs learning of a wide angle-of-view image generation section based on the wide angle-of-view image and an output that is generated when the plurality of input images are inputted to the wide angle-of-view image generation section, which generates and outputs an image having an angle of view including all the angles of view of a plurality of images in response to the input of the plurality of images.

According to an aspect of the present invention, the learning apparatus further includes an input image generation section that generates the plurality of input images based on the wide angle-of-view image. The input image acquisition section acquires the plurality of input images generated by the input image generation section.

In this aspect, the input image generation section may generate a plurality of combinations of the plurality of input images depicting different locations, based on the wide angle-of-view image, within the wide angle-of-view image. Further, the input image generation section may generate the wide angle-of-view image associated with each of the combinations based on the wide angle-of-view image. Furthermore, the learning section may use the generated plurality of combinations to perform the learning of the wide angle-of-view image generation section based on the plurality of input images belonging to a relevant combination and the wide angle-of-view image associated with the relevant combination.

An image generation apparatus according to the present invention includes an input image acquisition section and a wide angle-of-view image generation section. The input image acquisition section acquires a plurality of input images that are individually captured by a plurality of cameras included in an imaging apparatus at a predetermined angle of view in a predetermined relative imaging direction. The wide angle-of-view image generation section generates and outputs an image having an angle of view including all the angles of view of the plurality of input images in response to the input of the plurality of input images. The wide angle-of-view image generation section is a machine learning model learned based on an image and an output that is generated when a plurality of images individually including a part of the angle of view of the image are inputted to the wide angle-of-view image generation section.

According to an aspect of the present invention, the plurality of cameras are mounted on different surfaces of the imaging apparatus.

A learning method according to the present invention includes the steps of acquiring a plurality of input images that individually depict a state imaged at a predetermined angle of view in a predetermined relative imaging direction, acquiring a wide angle-of-view image having an angle of view including all the angles of view of the plurality of input images, and performing learning of a wide angle-of-view image generation section based on the wide angle-of-view image and an output that is generated when the plurality of input images are inputted to the wide angle-of-view image generation section, which generates and outputs an image having an angle of view including all the angles of view of a plurality of images in response to the input of the plurality of images.

An image generation method according to the present invention includes the steps of acquiring a plurality of input images that are individually captured by a plurality of cameras included in an imaging apparatus at a predetermined angle of view in a predetermined relative imaging direction, and causing a wide angle-of-view image generation section to generate and output an image having an angle of view including all the angles of view of the plurality of input images by inputting the plurality of input images to the wide angle-of-view image generation section, which is a machine learning model learned based on an image and an output that is generated when a plurality of images individually including a part of the angle of view of the image are inputted.

A program according to the present invention causes a computer to perform procedures for acquiring a plurality of input images that individually depict a state imaged at a predetermined angle of view in a predetermined relative imaging direction, acquiring a wide angle-of-view image having an angle of view including all the angles of view of the plurality of input images, and performing learning of a wide angle-of-view image generation section based on the wide angle-of-view image and an output that is generated when the plurality of input images are inputted to the wide angle-of-view image generation section, which generates and outputs an image having an angle of view including all the angles of view of a plurality of images in response to the input of the plurality of images.

Another program according to the present invention causes a computer to perform procedures for acquiring a plurality of input images that are individually captured by a plurality of cameras included in an imaging apparatus at a predetermined angle of view in a predetermined relative imaging direction, and causing a wide angle-of-view image generation section to generate and output an image having an angle of view including all the angles of view of the plurality of input images by inputting the plurality of input images to the wide angle-of-view image generation section, which is a machine learning model learned based on an image and an output that is generated when a plurality of images individually including a part of the angle of view of the image are inputted.

DESCRIPTION OF EMBODIMENT

An embodiment of the present invention will now be described with reference to the accompanying drawings.

Figure 1:
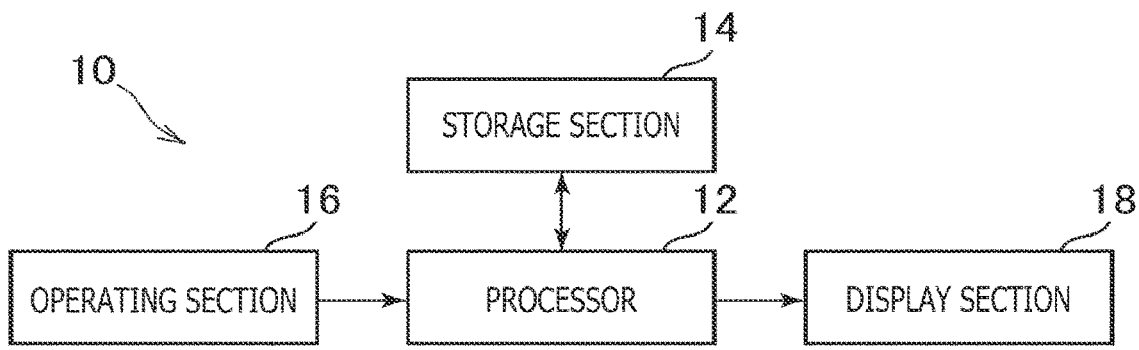
FIG. 1 is a diagram illustrating a configuration of an image processing apparatus according to an embodiment of the present invention.

FIG. 1 is a diagram illustrating a configuration of an image processing apparatus 10 according to the present embodiment. The image processing apparatus 10 according to the present embodiment is, for example, a computer such as a game console or a personal computer. As depicted in FIG. 1, the image processing apparatus 10 according to the present embodiment includes, for example, a processor 12, a storage section 14, an operating section 16, and a display section 18.

The processor 12 is a CPU (Central Processing Unit) or other program-controlled device that operates in accordance with a program installed, for example, on the image processing apparatus 10.

The storage section 14 is, for example, a ROM (Read-Only Memory), a RAM (Random Access Memory), or other storage element or a hard disk drive. The storage section 14 stores, for example, a program to be executed by the processor 12.

The operating section 16 is a user interface, for example, for a controller such as a keyboard, a mouse, or a game console. In response to a user operation input, the operating section 16 outputs a signal representative of the user operation input to the processor 12.

The display section 18, which is a liquid-crystal display or other display device, displays various types of images based on an instruction from the processor 12.

The image processing apparatus 10 may include, for example, a network board or other communication interface, an optical disk drive capable of reading an optical disk such as a DVD (Digital Versatile Disc)-ROM and a Blu-ray (registered trademark) disk, and a USB (Universal Serial Bus) port.

A learned machine learning model is implemented in the image processing apparatus 10 according to the present embodiment. Based on a planar image or other two-dimensional image captured by a regular camera through the use of the learned machine learning model, the image processing apparatus 10 generates an image that has a wider angle of view than the two-dimensional image and is supplemented with objects and scenes outside the angle of view of the two-dimensional image.

In the above instance, the image processing apparatus 10 may generate, for example, an image that has an angle of view including all the angles of view of a plurality of images captured individually by a plurality of regular cameras included in a smartphone or other imaging apparatus.

Further, the image processing apparatus 10 may generate, for example, an omnidirectional image (360-degree image) or a semi-omnidirectional image (180-degree image). Furthermore, the image processing apparatus 10 may generate, for example, a panoramic image.

An example of learning of the machine learning model implemented in the image processing apparatus 10 will now be described.

Figure 2:
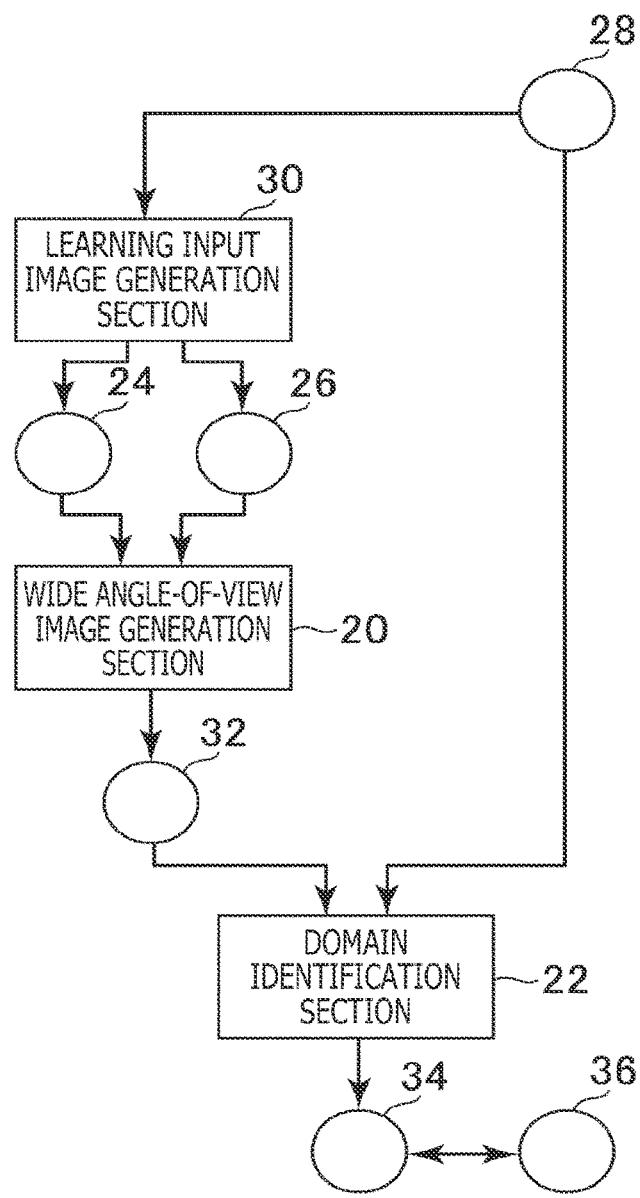
FIG. 2 is a diagram illustrating an example of learning according to an embodiment of the present invention.

In the present embodiment, the learning of a wide angle-of-view image generation section 20 is performed as depicted in FIG. 2. Data used here for the learning of the wide angle-of-view image generation section 20 is referred to as the learning data.

The following describes a learning example in which a GAN (Generative Adversarial Network) is used to learn not only the wide angle-of-view image generation section 20 but also a domain identification section 22.

The wide angle-of-view image generation section 20 is a machine learning model implemented, for example, by a convolutional neural network (CNN). For example, a plurality of two-dimensional images or other images individually depicting a state imaged at a predetermined angle of view in a predetermined relative imaging direction are inputted to the wide angle-of-view image generation section 20. In this instance, a plurality of images captured individually by a plurality of cameras included in a smartphone or other imaging apparatus may be inputted to the wide angle-of-view image generation section 20. The angle of view of each of the plurality of cameras is predetermined. Further, the relative imaging direction of each of the plurality of cameras is also predetermined.

The wide angle-of-view image generation section 20 then estimates the environment outside the angles of view of the plurality of inputted images such as objects and scenes outside the angles of view of the plurality of inputted images. Subsequently, the wide angle-of-view image generation section 20 generates, for example, an image that reflects the result of estimation and has a wider angle of view than the inputted images.

In the above instance, an image having an angle of view including all the angles of view of the plurality of inputted images. Further, the generated image may be an image that is supplemented with images depicting areas outside the angles of view of the plurality of inputted images. Moreover, for example, an omnidirectional image or a semi-omnidirectional image may be generated in the above instance. Additionally, a panoramic image may be generated. Furthermore, the generated image may be a high dynamic range (HDR) image. The wide angle-of-view image generation section 20 then outputs the generated image.

The following description assumes that the wide angle-of-view image generation section 20 generates and outputs an image having an angle of view including, for example, both angles of view of two inputted two-dimensional images.

The domain identification section 22 is, for example, a machine learning model implemented by the CNN. For example, either an image generated by the wide angle-of-view image generation section 20 or an image not generated by the wide angle-of-view image generation section 20 is inputted to the domain identification section 22. The domain identification section 22 then outputs, for example, the result of identification indicating whether or not the image inputted to the domain identification section 22 is generated by the wide angle-of-view image generation section 20. In this instance, the domain identification section 22 may output data indicating the possibility of the image inputted to the domain identification section 22 being generated by the wide angle-of-view image generation section 20.

The learning data according to the present embodiment includes, for example, a first learning input image 24, a second learning input image 26, and a learning wide angle-of-view image 28.

Figure 3A:
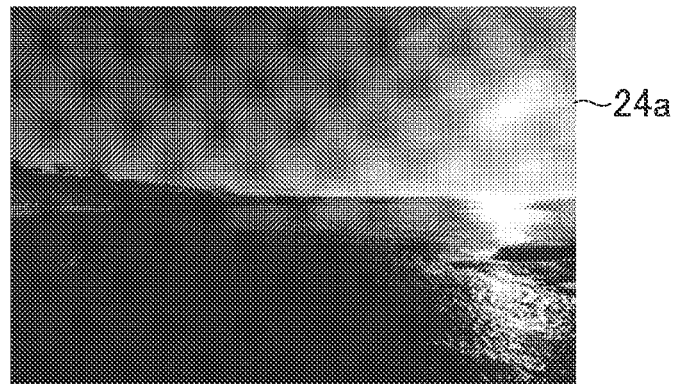
FIG. 3A is a diagram schematically illustrating an example of a first learning input image.
Figure 3B:
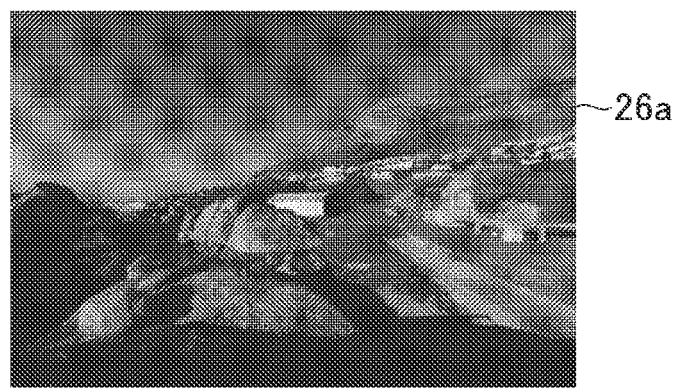
FIG. 3B is a diagram schematically illustrating an example of a second learning input image.
Figure 4:
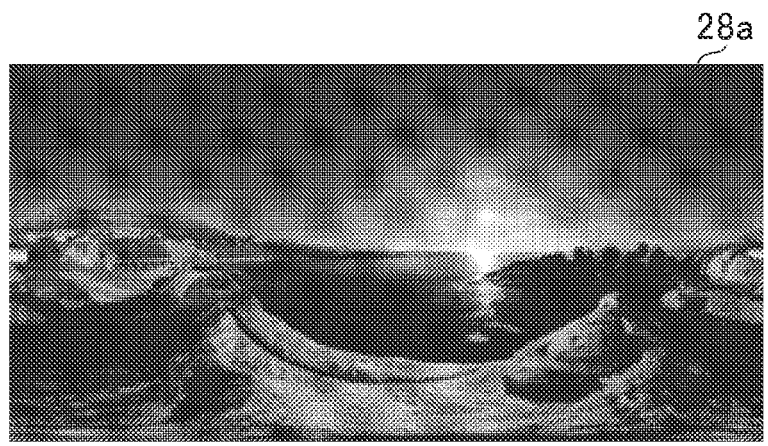
FIG. 4 is a diagram schematically illustrating an example of a learning wide angle-of-view image.

FIG. 3A is a diagram schematically illustrating an example of the first learning input image 24 (first learning input image 24a). FIG. 3B is a diagram schematically illustrating an example of the second learning input image 26 (second learning input image 26a). FIG. 4 is a diagram schematically illustrating an example of the learning wide angle-of-view image 28 (learning wide angle-of-view image 28a).

Figure 5A:
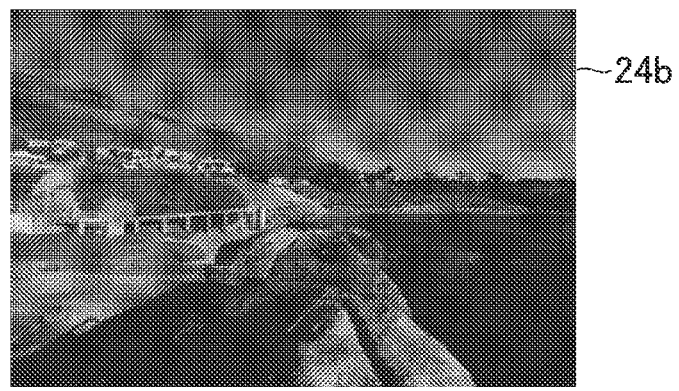
FIG. 5A is a diagram schematically illustrating another example of the first learning input image.
Figure 5B:
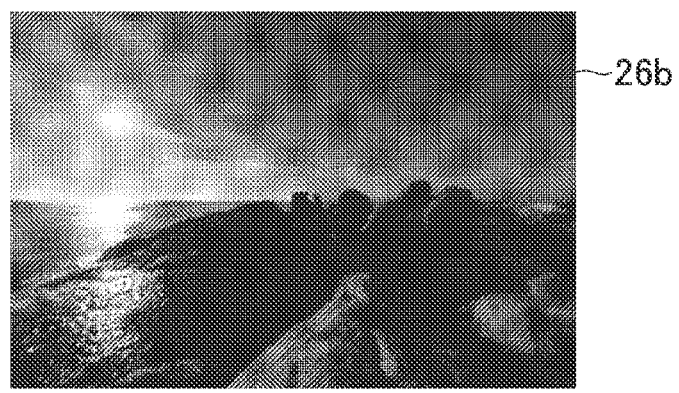
FIG. 5B is a diagram schematically illustrating another example of the second learning input image.
Figure 6:
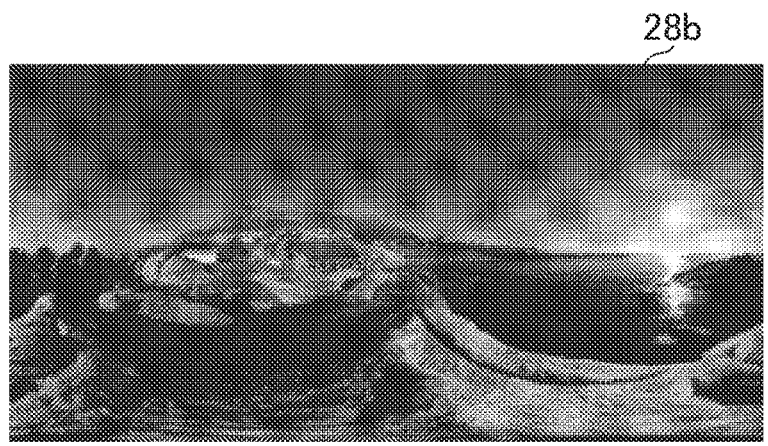
FIG. 6 is a diagram schematically illustrating another example of the learning wide angle-of-view image.

FIG. 5A is a diagram schematically illustrating another example of the first learning input image 24 (first learning input image 24b). FIG. 5B is a diagram schematically illustrating another example of the second learning input image 26 (second learning input image 26b). FIG. 6 is a diagram schematically illustrating another example of the learning wide angle-of-view image 28 (learning wide angle-of-view image 28b).

For example, one set of learning data includes a combination of the first learning input image 24a, the second learning input image 26a, and the learning wide angle-of-view image 28a. Further, for example, another set of learning data includes a combination of the first learning input image 24b, the second learning input image 26b, and the learning wide angle-of-view image 28b.

The first learning input image 24 and the second learning input image 26 may be captured, for example, in different directions at the same location. In this instance, for example, the relative imaging direction of the second learning input image 26 may be predetermined with respect to the imaging direction of the first learning input image 24. Further, the first learning input image 24 and the second learning input image 26 may be standard dynamic range (SDR) images. The images depicted in FIGS. 3A, 3B, 5A, and 5B are obtained by performing a binarization process on SDR images.

Further, the first learning input image 24 and the second learning input image 26 may be individually captured, for example, by a plurality of cameras included in an imaging apparatus at a predetermined angle of view in a predetermined relative imaging direction. More specifically, the first learning input image 24 may be captured, for example, by a first camera mounted on the front surface of a smartphone placed in a fixed position, and the second learning input image 26 may be captured, for example, by a second camera mounted on the back surface of the smartphone. In this case, the relative imaging direction of the second learning input image 26, which is determined with respect to the imaging direction of the first learning input image 24, is inevitably predetermined. Moreover, the angle of view of the first camera remains unchanged irrespective of the imaging direction. Additionally, the angle of view of the second camera also remains unchanged irrespective of the imaging direction.

The learning wide angle-of-view image 28 is, for example, not an image generated by the wide angle-of-view image generation section 20, but is a wide angle-of-view image such as an omnidirectional image captured by an omnidirectional camera or a semi-omnidirectional image captured by a semi-omnidirectional camera. The learning wide angle-of-view image 28 may be a panoramic image captured by a panoramic camera. Further, the learning wide angle-of-view image 28 may be an HDR image. The images depicted in FIGS. 4 and 6 are obtained by performing a binarization process on SDR images.

Further, the learning wide angle-of-view image 28 included in the learning data may be an image associated with the first learning input image 24 and the second learning input image 26 which are included in the learning data. For example, the learning wide angle-of-view image 28 included in the learning data may be an image captured at the same location as for the first learning input image 24 and the second learning input image 26 which are included in the learning data.

Further, based on the learning wide angle-of-view image 28, a learning input image generation section 30 in the present embodiment may generate, as depicted in FIG. 2, the first learning input image 24 and the second learning input image 26 that individually include a part of the angle of view of the learning wide angle-of-view image 28. In this instance, the learning input image generation section 30 may generate the first learning input image 24 and the second learning input image 26, for example, by performing noise addition, rotation, or other processing on a part of the angle of view of the learning wide angle-of-view image 28.

For example, the first learning input image 24a may be generated by extracting a partial image occupying an area having a first predetermined shape and size and positioned at a first predetermined location in the learning wide angle-of-view image 28a and performing a predetermined geometric transformation of the extracted partial image. Further, the second learning input image 26a may be generated by extracting a partial image occupying an area having a second predetermined shape and size and positioned at a second predetermined location in the learning wide angle-of-view image 28 and performing a predetermined geometric transformation of the extracted partial image. In this instance, the positional relation of the second predetermined location relative to the first predetermined location may be predetermined. In such a case, the first learning input image 24 and the second learning input image 26 depict a state imaged in a predetermined relative imaging direction.

Further, the first learning input image 24b and the second learning input image 26b may be similarly generated based on the learning wide angle-of-view image 28b.

In the above case, it is not necessary to take the trouble of capturing the first learning input image 24 and the second learning input image 26 that correspond to the learning wide angle-of-view image 28.

In the above instance, for example, the first predetermined location may be near the center in the learning wide angle-of-view image 28, and the second predetermined location may be near the left or right end in the learning wide angle-of-view image 28. Further, for example, the above-mentioned predetermined geometric transformation may geometrically transform an omnidirectional or semi-omnidirectional image into a two-dimensional image (planar image) captured by a regular camera.

Further, the first predetermined shape and size and the second predetermined shape and size may be the same or different from each other. For example, there is a case where a camera mounted on the front surface of a smartphone has a larger angle of view than a camera mounted on the back surface of the smartphone. In view of such circumstances, the first predetermined size may be larger than the second predetermined size.

In addition, based on a learning wide angle-of-view image 28, the learning input image generation section 30 may generate a plurality of combinations of a plurality of learning input images positioned at different locations within the learning wide angle-of-view image 28. Further, based on the learning wide angle-of-view image 28, the learning input image generation section 30 may generate different learning wide angle-of-view images 28 that are individually associated with the combinations. Furthermore, a plurality of different learning wide angle-of-view images 28 may be generated based on one learning wide angle-of-view image 28.

For example, a combination of the first learning input image 24a depicted in FIG. 3A and the second learning input image 26a depicted in FIG. 3B and a combination of the first learning input image 24b depicted in FIG. 5A and the second learning input image 26b depicted in FIG. 5B may be generated based on the learning wide angle-of-view image 28a depicted in FIG. 4.

In the above case, for example, the first learning input image 24a may be generated by extracting a partial image occupying an area having the first predetermined shape and size and positioned at the first predetermined location in the learning wide angle-of-view image 28a and performing a predetermined geometric transformation of the extracted partial image. Further, the second learning input image 26a may be generated by extracting a partial image occupying an area having the second predetermined shape and size and positioned at the second predetermined location in the learning wide angle-of-view image 28a and performing a predetermined geometric transformation of the extracted partial image. Moreover, the first learning input image 24b may be generated by extracting a partial image occupying an area having a third predetermined shape and size and positioned at a third predetermined location in the learning wide angle-of-view image 28a and performing a predetermined geometric transformation of the extracted partial image. Additionally, the second learning input image 26b may be generated by extracting a partial image occupying an area having a fourth predetermined shape and size and positioned at a fourth predetermined location in the learning wide angle-of-view image 28a and performing a predetermined geometric transformation of the extracted partial image.

In the above instance, the positional relation of the second predetermined location relative to the first predetermined location may be predetermined. Further, the positional relation of the fourth predetermined location relative to the third predetermined location may be predetermined.

In the above case, the learning wide angle-of-view image 28b depicted in FIG. 6 may be generated based on the learning wide angle-of-view image 28a depicted in FIG. 4, the first learning input image 24b depicted in FIG. 5A, and the second learning input image 26b depicted in FIG. 5B.

Further, the learning wide angle-of-view image 28b may be generated, for example, by translating the learning wide angle-of-view image 28a. In this case, a part of the right side of the learning wide angle-of-view image 28a may be disposed on the remaining left side of the learning wide angle-of-view image 28a. For example, in a situation where the learning wide angle-of-view image 28a depicted in FIG. 4 is an omnidirectional or semi-omnidirectional image captured at a certain location in a real space, the learning wide angle-of-view image 28b depicted in FIG. 6 is equivalent to an image depicting a state that is imaged in a changed imaging direction at a location where the learning wide angle-of-view image 28a is imaged.

Then, the first learning input image 24b and the second learning input image 26b may be generated based on the learning wide angle-of-view image 28b that is generated based on the learning wide angle-of-view image 28a as described above.

In the manner described above, a plurality of sets of learning data can be generated based on one learning wide angle-of-view image 28.

In learning according to the present embodiment, first, the first learning input image 24 and the second learning input image 26, which are included in the learning data, are inputted to the wide angle-of-view image generation section 20. Then, in response to the input of the first learning input image 24 and the second learning input image 26, the wide angle-of-view image generation section 20 generates an image having an angle of view including both the angle of view of the first learning input image 24 and the angle of view of the second learning input image 26. The image generated in the above manner is referred to as a generated wide angle-of-view image 32.

Next, either the generated wide angle-of-view image 32 generated based on the first learning input image 24 and the second learning input image 26 included in the learning data or the learning wide angle-of-view image 28 included in the learning data is inputted to the domain identification section 22.

Next, the domain identification section 22 outputs generation possibility data 34 indicating the possibility of the image inputted to the domain identification section 22 being the generated wide angle-of-view image 32. Then, the error (the result of comparison) between the generation possibility data 34 and the domain identification data 36 is determined. The domain identification data 36 indicates whether the image inputted to the domain identification section 22 is the generated wide angle-of-view image 32 or the learning wide angle-of-view image 28.

In this instance, a value associated with either the generated wide angle-of-view image 32 or the learning wide angle-of-view image 28 may be set as the value of the domain identification data 36.

For example, the value of the generation possibility data 34 may be 0 or greater and not greater than 1. In this case, the value of the domain identification data 36 may be, for example, 1 when the generated wide angle-of-view image 32 is inputted to the domain identification section 22, and 0 when the learning wide angle-of-view image 28 is inputted to the domain identification section 22.

Further, the generation possibility data 34 and the domain identification data 36 may be expressed, for example, as a vector containing two elements. For example, the value of a first element of the generation possibility data 34 may indicate the possibility of the image inputted to the domain identification section 22 being the generated wide angle-of-view image 32. Furthermore, the value of a second element of the generation possibility data 34 may indicate the possibility of the image inputted to the domain identification section 22 being the learning wide angle-of-view image 28. In this case, the value of the domain identification data 36 associated with the generated wide angle-of-view image 32 may be expressed by the two-dimensional vector (1,0), and the value of the domain identification data 36 associated with the learning wide angle-of-view image 28 may be expressed by the two-dimensional vector (0,1).

Then, in the present embodiment, for example, the value of a parameter of the wide angle-of-view image generation section 20 or the domain identification section 22 is updated based on the error between the generation possibility data 34 and the domain identification data 36 by using, for example, the error backpropagation method.

Here, in the learning according to the present embodiment, the update of the value of the parameter of the wide angle-of-view image generation section 20 by using a predetermined number of sets of learning data and the update of the value of the parameter of the domain identification section 22 by using a predetermined number of sets of learning data are alternately repeated. The value of the parameter of the wide angle-of-view image generation section 20 is updated while the value of the parameter of the domain identification section 22 remains unchanged. Further, the value of the parameter of the domain identification section 22 is updated while the value of the parameter of the wide angle-of-view image generation section 20 remains unchanged.

In the manner described above, the machine learning model implemented in the image processing apparatus 10 is learned.

The method of learning according to the present embodiment is not limited to the above-described one. As depicted, for example, in FIG. 7, the learning according to the present embodiment may be performed without using the GAN technology.

Figure 7:
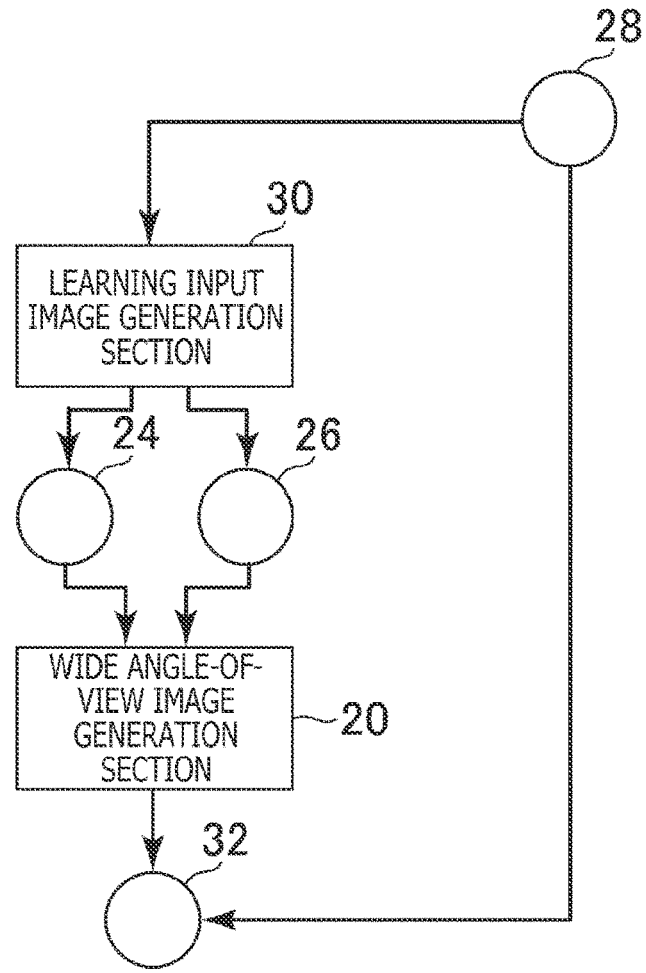
FIG. 7 is a diagram illustrating another example of learning according to an embodiment of the present invention.

In the example of FIG. 7, the learning of the wide angle-of-view image generation section 20 is performed without using the domain identification section 22. The learning wide angle-of-view image 28 included in the learning data for learning depicted in FIG. 7 is an image associated with the first learning input image 24 and the second learning input image 26 included in the learning data. The learning wide angle-of-view image 28 included in the learning data is, for example, an image captured at the same location as for the first learning input image 24 and the second learning input image 26 included in the learning data. In this instance, based on the learning wide angle-of-view image 28 included in the learning data, the learning input image generation section 30 may generate the first learning input image 24 and the second learning input image 26 that are to be included in the learning data.

For example, determined in the above case is an error (the result of comparison) between the generated wide angle-of-view image 32 which is generated based on the first learning input image 24 and the second learning input image 26 included in the learning data, and the learning wide angle-of-view image 28 which is included in the learning data. In this instance, for example, a mean absolute error (MAE), a mean squared error (MSE), or a root mean squared error (RMSE) may be determined. Then, based on the determined error, the value of the parameter of the wide angle-of-view image generation section 20 is updated by using, for example, the error backpropagation method.

In the present embodiment, for example, an image having a wider angle of view than a two-dimensional image, such as a planar image captured by a regular camera, is generated by using the machine learning model on which learning is performed as described above. For example, based on two images, an image having an angle of view including both angles of view of the two images is generated.

Figure 8:
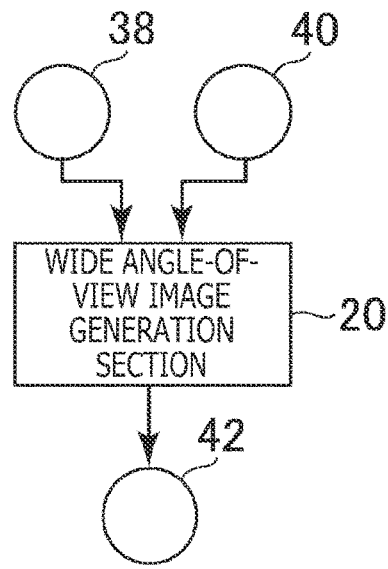
FIG. 8 is a diagram illustrating an example of image generation according to an embodiment of the present invention.

Performing image generation by using a learned machine learning model will now be described with reference to FIG. 8.

First, an image captured by the first camera mounted on the front surface of the smartphone and an image captured by the second camera mounted on the back surface of the smartphone are inputted to the wide angle-of-view image generation section 20 which is learned. The image captured by the first camera and inputted to the learned wide angle-of-view image generation section 20 is hereinafter referred to as the first target input image 38. Further, the image captured by the second camera and inputted to the learned wide angle-of-view image generation section 20 is hereinafter referred to as the second target input image 40. The first target input image 38 and the second target input image 40 may be SDR images.

Next, the wide angle-of-view image generation section 20 generates and outputs an image based on the first target input image 38 and the second target input image 40. The image generated in this instance has an angle of view including both angles of view of the first target input image 38 and the second target input image 40. Further, the generated image may be supplemented with images depicting areas outside the angles of view of the first target input image 38 and the second target input image 40. The generated image is hereinafter referred to as the target wide angle-of-view image 42. The target wide angle-of-view image 42 may be an HDR image. Subsequently, the wide angle-of-view image generation section 20 outputs the generated target wide angle-of-view image 42.

The present embodiment is configured such that, in response to the input of a plurality of images whose relation in imaging direction is predefined, the wide angle-of-view image generation section 20 estimates the environment outside the angles of view of the plurality of images as described above. Eventually, the wide angle-of-view image generation section 20 outputs the target wide angle-of-view image 42 reflecting the result of estimation.

As is obvious from the above description, the present embodiment makes it easy to obtain an accurate wide angle-of-view image. For example, a light source for image-based lighting (IBL) may be set up based on the target wide angle-of-view image 42 generated by the image processing apparatus 10 according to the present embodiment. It is needless to say that the use of the target wide angle-of-view image 42 generated by the image processing apparatus 10 according to the present embodiment is not limited to IBL.

Further, for an image captured by a camera included in a smartphone or other imaging apparatus, the wide angle-of-view image generation section 20 according to the present embodiment generates the target wide angle-of-view image 42 based on the first target input image 38 and the second target input image 40. Moreover, the learning of the wide angle-of-view image generation section 20 described above can be performed without using a camera included in a smartphone or other imaging apparatus.

The following describes the functions of the image processing apparatus 10 according to the present embodiment and the processes performed by the image processing apparatus 10.

Figure 9:
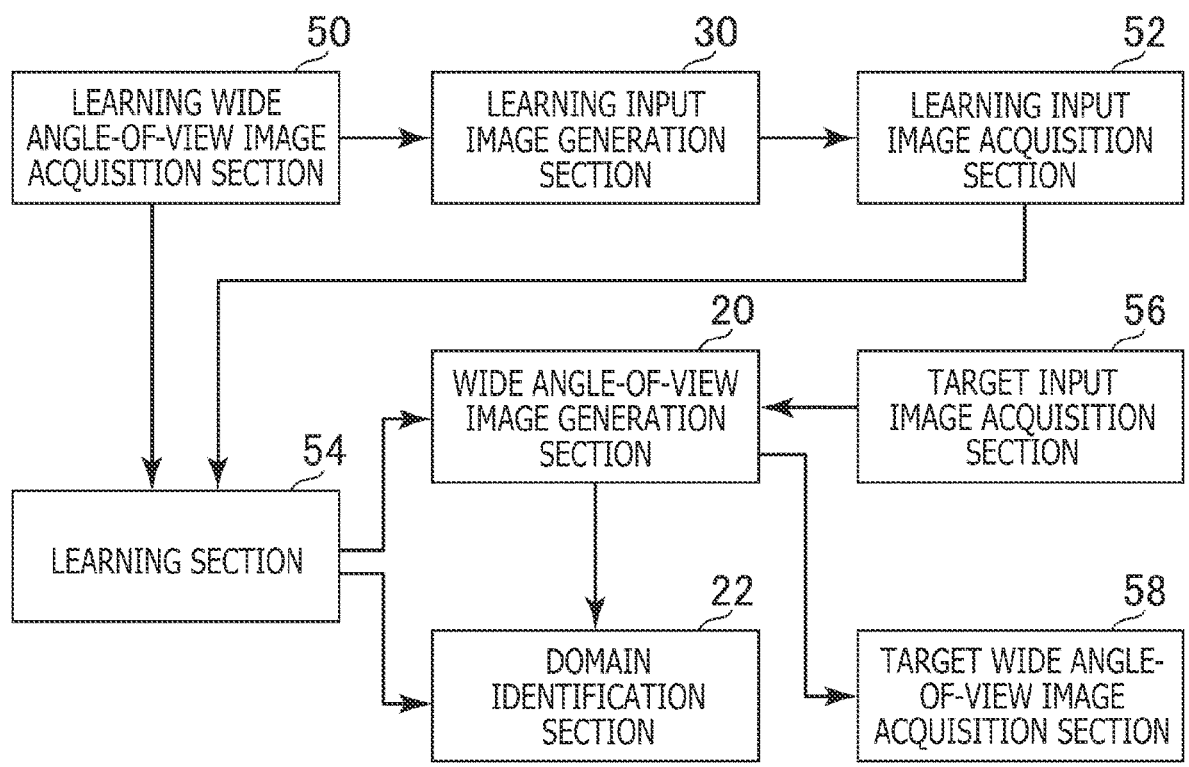
FIG. 9 is a functional block diagram illustrating examples of functions implemented by the image processing apparatus according to an embodiment of the present invention.

FIG. 9 is a functional block diagram illustrating examples of functions implemented by the image processing apparatus 10 according to the present embodiment. All the functions depicted in FIG. 9 need not be implemented by the image processing apparatus 10 according to the present embodiment. Further, functions other than those depicted in FIG. 9 may be implemented by the image processing apparatus 10 according to the present embodiment.

As depicted in FIG. 9, the image processing apparatus 10 according to the present embodiment functionally includes, for example, the wide angle-of-view image generation section 20, the domain identification section 22, the learning input image generation section 30, a learning wide angle-of-view image acquisition section 50, a learning input image acquisition section 52, a learning section 54, a target input image acquisition section 56, and a target wide angle-of-view image acquisition section 58. The above elements are mainly implemented in the processor 12 and the storage section 14.

The image processing apparatus 10 according to the present embodiment functions not only as a learning apparatus for performing the learning of the machine learning model implemented in the image processing apparatus 10, but also as an image generation apparatus for generating images by using a learned machine learning model. In the example of FIG. 9, the wide angle-of-view image generation section 20, the domain identification section 22, the learning input image generation section 30, the learning wide angle-of-view image acquisition section 50, the learning input image acquisition section 52, and the learning section 54 perform the functions of the learning apparatus. Further, the wide angle-of-view image generation section 20, the domain identification section 22, the target input image acquisition section 56, and the target wide angle-of-view image acquisition section 58 perform the functions of the image generation apparatus.

The above functions may be implemented by allowing the processor 12 to execute a program that contains commands corresponding to the above functions and is installed on the image processing apparatus 10 which is a computer. The program may be supplied to the image processing apparatus 10, for example, through the Internet or through a computer-readable information storage medium, such as an optical disk, a magnetic disk, a magnetic tape, a magneto-optical disk, or a flash memory.

In the above-described embodiment, for example, in response to the input of a plurality of images individually depicting a state imaged at a predetermined angle of view in a predetermined relative imaging direction, the wide angle-of-view image generation section 20 generates and outputs an image having an angle of view including all the angles of view of the plurality of images. In this instance, the wide angle-of-view image generation section 20 may generate and output an image that is supplemented with images depicting areas outside the angles of view of a plurality of inputted images. Further, the wide angle-of-view image generation section 20 may be implemented by the CNN or other machine learning model.

In the present embodiment, as described above, the domain identification section 22 outputs, for example, the result of identification indicating whether or not the image inputted to the domain identification section 22 is generated by the wide angle-of-view image generation section 20. Further, the domain identification section 22 may be implemented by the CNN or other machine learning model.

In the present embodiment, as described above, the learning input image generation section 30 generates a plurality of learning input images based, for example, on the learning wide angle-of-view image 28. For example, the learning input image generation section 30 generate the first learning input image 24 and the second learning input image 26 based on the learning wide angle-of-view image 28. The learning input image generation section 30 may generate a plurality of learning input images based on the learning wide angle-of-view image 28 acquired by the learning wide angle-of-view image acquisition section 50.

Further, based on the learning wide angle-of-view image 28a, the learning input image generation section 30 may generate a plurality of learning input images associated with the learning wide angle-of-view image 28a. Moreover, based on the learning wide angle-of-view image 28a, the learning input image generation section 30 may generate the other learning wide angle-of-view image 28b. Additionally, the learning input image generation section 30 may generate a plurality of learning input images associated with the other learning wide angle-of-view image 28b.

In the present embodiment, the learning wide angle-of-view image acquisition section 50 acquires, for example, the learning wide angle-of-view image 28 having an angle of view including all the angles of view of a plurality of learning input images.

In the present embodiment, the learning input image acquisition section 52 acquires, for example, a plurality of learning input images individually depicting a state imaged at a predetermined angle of view in a predetermined relative imaging direction. In this instance, the learning input image acquisition section 52 may acquire, for example, the learning input images generated by the learning input image generation section 30. The plurality of learning input images to be acquired by the learning input image acquisition section 52 need not always be generated by the learning input image generation section 30. The plurality of learning input images to be acquired by the learning input image acquisition section 52 may be individually captured, for example, by regular cameras included in a smartphone or other imaging apparatus at a predetermined angle of view in a predetermined relative imaging direction.

Further, the learning input image acquisition section 52 may generate the learning data that includes the plurality of learning input images acquired by the learning input image acquisition section 52 and the learning wide angle-of-view image 28 acquired by the learning wide angle-of-view image acquisition section 50. In this case, the generated learning data may include the learning wide angle-of-view image 28 acquired by the learning wide angle-of-view image acquisition section 50 and the plurality of learning input images generated based on the learning wide angle-of-view image 28.

In the present embodiment, the learning section 54 determines, for example, an output that is generated when the plurality of learning input images acquired by the learning input image acquisition section 52 are inputted to the wide angle-of-view image generation section 20. The output is equivalent to the generated wide angle-of-view image 32 in the foregoing example. Next, the learning section 54 in the present embodiment performs the learning of the wide angle-of-view image generation section 20 based, for example, on the determined output and the learning wide angle-of-view image 28 acquired by the learning wide angle-of-view image acquisition section 50. In this instance, the learning of the wide angle-of-view image generation section 20 and the domain identification section 22 may be performed.

In the above instance, as described earlier, the learning input image generation section 30 may generate, based on the learning wide angle-of-view image 28, a plurality of combinations of a plurality of learning input images differing in depicted location within the learning wide angle-of-view image 28. Further, based on the learning wide angle-of-view image 28, the learning input image generation section 30 may generate different learning wide angle-of-view images 28 that are individually associated with the combinations. Further, a plurality of different learning wide angle-of-view images 28 may be generated in the above instance based on a single learning wide angle-of-view image 28.

Further, in the above case, by using, for example, the plurality of generated combinations, the learning section 54 may perform the learning of the wide angle-of-view image generation section 20 based on a plurality of learning input images belonging to the combinations and with the learning wide angle-of-view images 28 associated with the combinations.

For example, in a case where the other learning wide angle-of-view image 28b is generated by the learning input image generation section 30 based on the learning wide angle-of-view image 28a, the learning section 54 may perform the learning of the wide angle-of-view image generation section 20 based on the learning wide angle-of-view image 28a and with an output generated when the plurality of learning input images associated with the learning wide angle-of-view image 28a are inputted to the wide angle-of-view image generation section 20. Further, the learning section 54 may perform the learning of the wide angle-of-view image generation section 20 based on the learning wide angle-of-view image 28b and with an output generated when the plurality of learning input images associated with the learning wide angle-of-view image 28b are inputted to the wide angle-of-view image generation section 20.

The learning section 54 may determine an output that is generated when a plurality of learning input images included in the learning data generated by the learning input image acquisition section 52 are inputted to the wide angle-of-view image generation section 20. Then, based on the determined output and the learning wide angle-of-view image 28 included in the learning data, the learning section 54 may perform the learning of the wide angle-of-view image generation section 20.

In the present embodiment, the target input image acquisition section 56 acquires, for example, a plurality of target input images that are inputted to a learned wide angle-of-view image generation section 20. In this instance, for example, the target input image acquisition section 56 may acquire the first target input image 38 and the second target input image 40.

Further, the target input image acquisition section 56 may acquire a plurality of target input images that are captured individually by a plurality of cameras included in an imaging apparatus. Furthermore, the target input image acquisition section 56 may acquire a plurality of target input images that are captured individually by a plurality of cameras mounted on different surfaces of a smartphone or other imaging apparatus.

In the present embodiment, the target wide angle-of-view image acquisition section 58 acquires, for example, the target wide angle-of-view image 42 that is generated and outputted by the wide angle-of-view image generation section 20 in response to the input of a plurality of target input images as described earlier. The target wide angle-of-view image acquisition section 58 acquires the target wide angle-of-view image 42 that is generated and outputted by the wide angle-of-view image generation section 20 in response, for example, to the input of the first target input image 38 and the second target input image 40.

Figure 10:
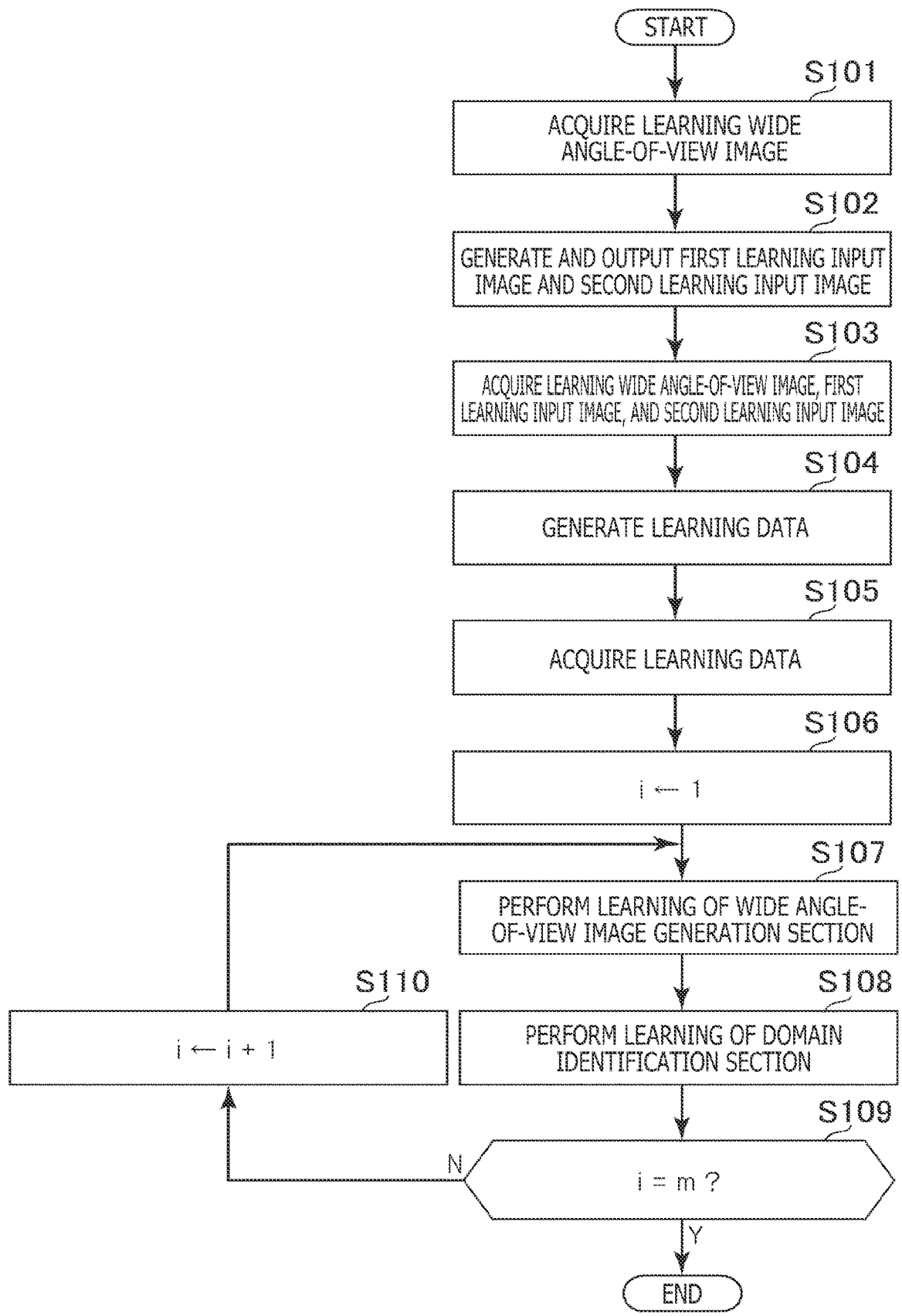
FIG. 10 is a flowchart illustrating an example of a learning process performed by the image processing apparatus according to an embodiment of the present invention.

An example of a learning process performed on the wide angle-of-view image generation section 20 by the image processing apparatus 10 according to the present embodiment will now be described with reference to the flowchart illustrated in FIG. 10. The example process depicted in FIG. 10 corresponds to the learning described with reference to FIG. 2. In the example process depicted in FIG. 10, the learning of the domain identification section 22 is performed together with the learning of the wide angle-of-view image generation section 20.

First, the learning wide angle-of-view image acquisition section 50 acquires a plurality of learning wide angle-of-view images 28 (step S101).

Next, the learning input image generation section 30 generates and outputs the first learning input image 24 and the second learning input image 26 that are associated individually with the plurality of learning wide angle-of-view images 28 acquired in step S101 (step S102).

Next, the learning input image acquisition section 52 acquires the plurality of learning wide angle-of-view images 28 acquired in step S101 and the first learning input image 24 and the second learning input image 26 outputted in step S102 (step S103).

Next, the learning input image acquisition section 52 generates a plurality of sets of learning data that are associated individually with the plurality of learning wide angle-of-view images 28 acquired in step S103 (step S104). In step S104, for example, the learning data is generated for each of the plurality of learning wide angle-of-view images 28, and the generated learning data includes the associated learning wide angle-of-view image 28 and the first learning input image 24 and the second learning input image 26 generated based on the associated learning wide angle-of-view image 28.

Next, the learning section 54 acquires the plurality of sets of learning data generated in step S104 (step S105). Here, it is assumed, for example, that m×2n (m and n are integers) sets of learning data are acquired. Further, it is assumed that the m×2n sets of learning data are divided into data groups each of which includes 2n sets of learning data. A data group designated as the i-th group (1≤i≤m) is hereinafter referred to as the i-th data group.

Next, the learning section 54 sets the value of a variable i to 1 (step S106).

Next, the learning section 54 performs the learning of the wide angle-of-view image generation section 20 by using n sets of learning data included in the i-th data group (step S107). In step S107, the value of the parameter of the wide angle-of-view image generation section 20 is updated while the value of the parameter of the domain identification section 22 remains unchanged.

Next, the learning section 54 performs the learning of the domain identification section 22 by using the remaining n sets of learning data which are included in the i-th data group but not used in step S107 (step S108). In step S108, the value of the parameter of the domain identification section 22 is updated while the value of the parameter of the wide angle-of-view image generation section 20 remains unchanged.

Next, the learning section 54 determines whether or not the value of the variable i is m (step S109). If the value is not m ("N" in step S109), the learning section 54 increments the value of the variable i by one (step S110), and then processing returns to step S107. Meanwhile, if the value is m ("Y" in step S109), the process depicted in the present processing example terminates.

Figure 11:
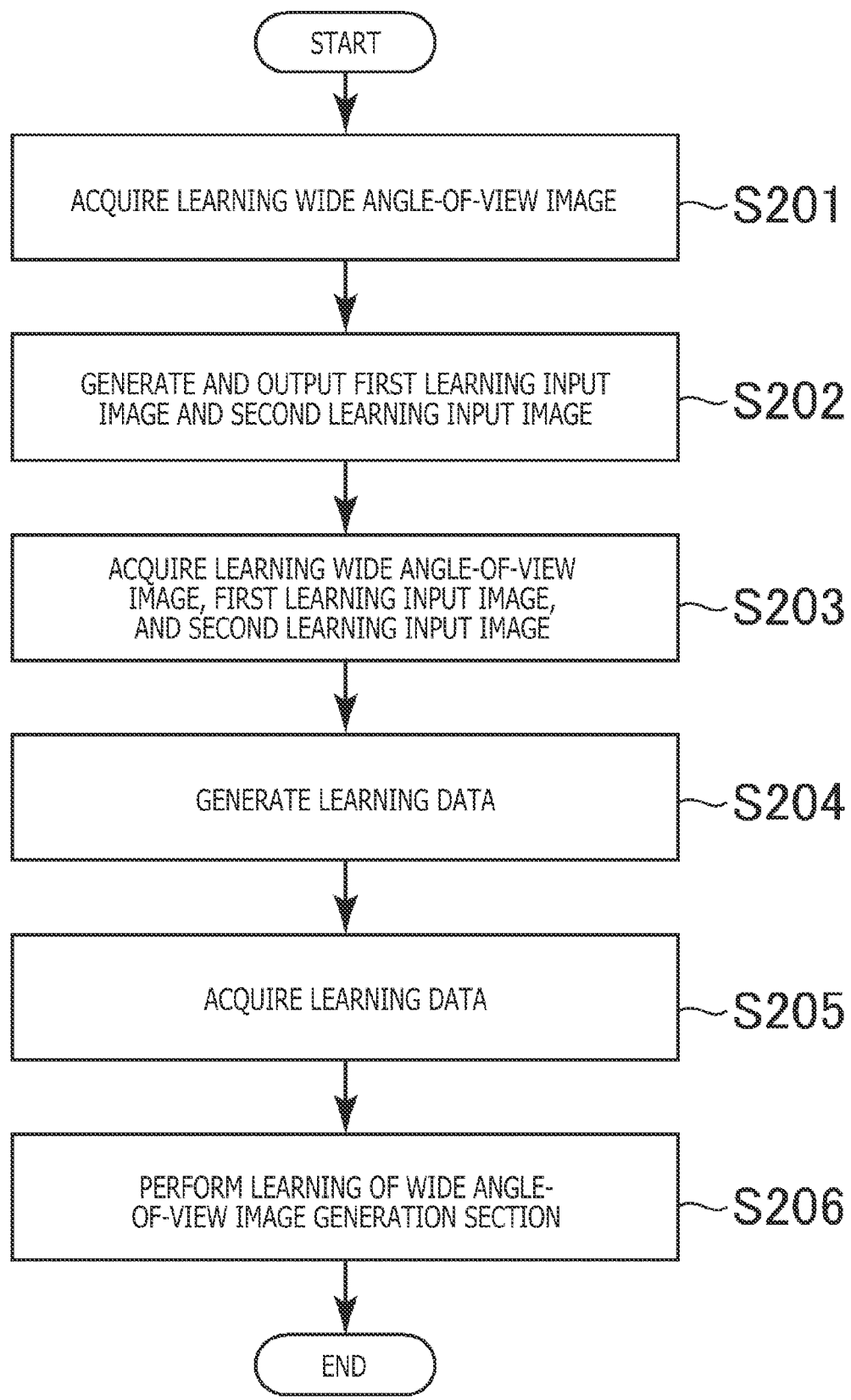
FIG. 11 is a flowchart illustrating another example of the learning process performed by the image processing apparatus according to an embodiment of the present invention.

Another example of the learning process performed on the wide angle-of-view image generation section 20 by the image processing apparatus 10 according to the present embodiment will now be described with reference to the flowchart illustrated in FIG. 11. The example process depicted in FIG. 11 corresponds to the learning described with reference to FIG. 7.

First, the learning wide angle-of-view image acquisition section 50 acquires a plurality of learning wide angle-of-view images 28 (step S201).

Next, the learning input image generation section 30 generates and outputs the first learning input image 24 and the second learning input image 26 that are associated individually with the plurality of learning wide angle-of-view images 28 acquired in step S201 (step S202).

Next, the learning input image acquisition section 52 acquires the plurality of learning wide angle-of-view images 28 acquired in step S201 and the first learning input image 24 and the second learning input image 26 outputted in step S202 (step S203).

Next, the learning input image acquisition section 52 generates a plurality of sets of learning data that are associated individually with the plurality of learning wide angle-of-view images 28 acquired in step S203 (step S204). In step S204, for example, the learning data is generated for each of the plurality of learning wide angle-of-view images 28, and the generated learning data includes the associated learning wide angle-of-view image 28 and the first learning input image 24 and the second learning input image 26 generated based on the associated learning wide angle-of-view image 28.

Next, the learning section 54 acquires the plurality of sets of learning data generated in step S204 (step S205).

Next, the learning section 54 performs the learning of the wide angle-of-view image generation section 20 by using the plurality of sets of learning data acquired in step S205 (step S206), and then the process depicted in the present processing example terminates.

Figure 12:
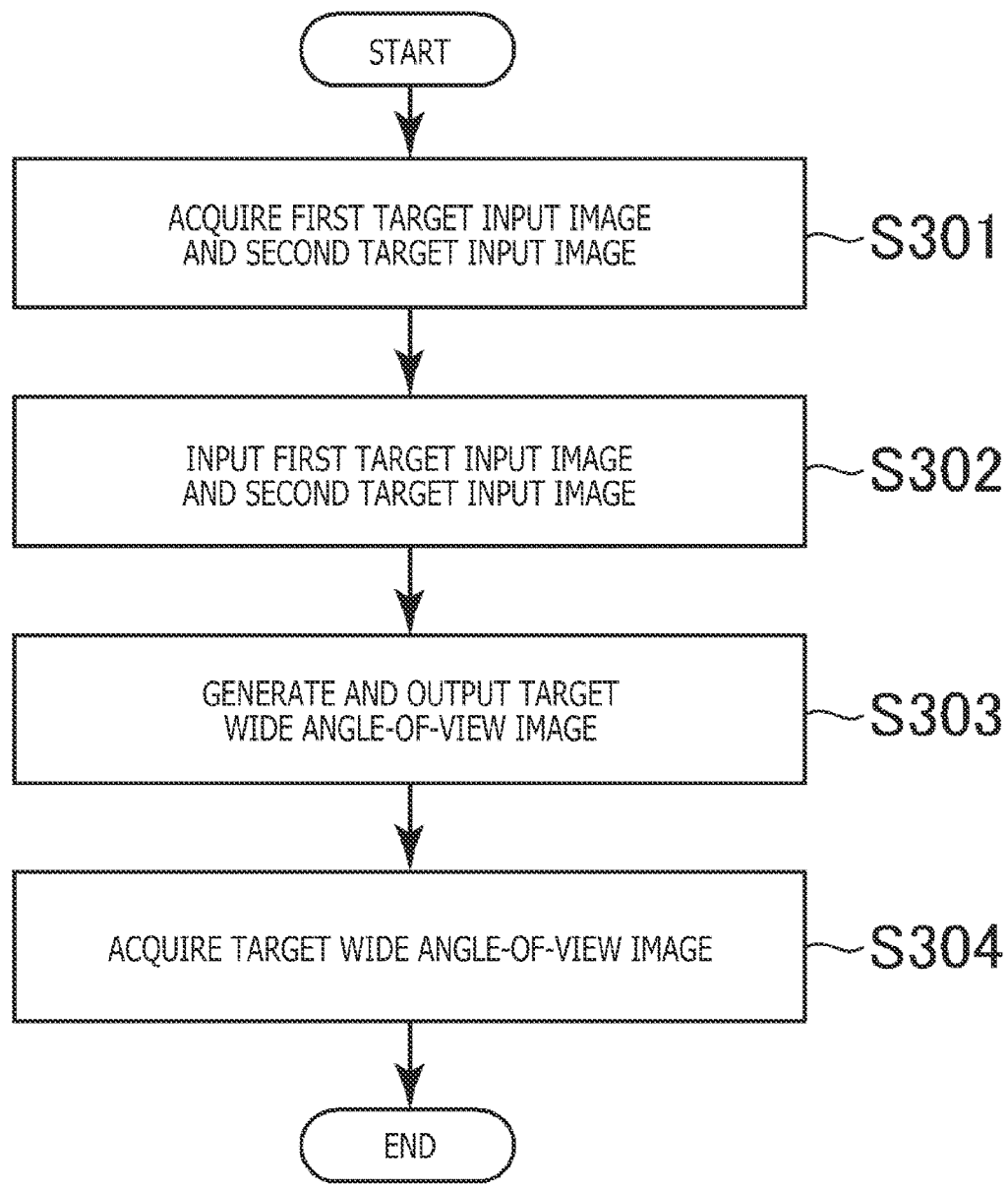
FIG. 12 is a flowchart illustrating an example of a process that is performed by the image processing apparatus according to an embodiment of the present invention in order to generate a target wide angle-of-view image.

An example of a process performed by the image processing apparatus 10 according to the present embodiment in order to generate the target wide angle-of-view image 42 will now be described with reference to the flowchart illustrated in FIG. 12.

First, the target input image acquisition section 56 acquires the first target input image 38 and the second target input image 40 (step S301).

Next, the target input image acquisition section 56 inputs the first target input image 38 and the second target input image 40 acquired in step S301 to the wide angle-of-view image generation section 20 (step S302).

Next, the wide angle-of-view image generation section 20 generates the target wide angle-of-view image 42 based on the first target input image 38 and the second target input image 40 inputted in step S302, and outputs the generated target wide angle-of-view image 42 (step S303).

Next, the target wide angle-of-view image acquisition section 58 acquires the target wide angle-of-view image 42 outputted in step S303 (step S304), and then the process depicted in the present processing example terminates.

It should be noted that the present invention is not limited to the foregoing embodiment.

For example, two cameras included in a smartphone or other imaging apparatus need not always be individually mounted on the front and back surfaces of the imaging apparatus. The two cameras included in the imaging apparatus may be individually mounted, for example, on the front and side surfaces of the imaging apparatus.

Further, it is conceivable that the imaging apparatus may include, for example, three or more cameras. In this case, in response to the input of images captured by the three or more cameras, the wide angle-of-view image generation section 20 may generate, for example, an image having an angle of view including all the angles of view of images captured by the three or more cameras. In this case, the learning data includes the same number of learning input images as the number of cameras. Further, in this case, the learning input image generation section 30 generates the same number of learning input images as the number of cameras based on the learning wide angle-of-view image 28. Furthermore, in this case, images captured by the three or more cameras included in the imaging apparatus are inputted to the wide angle-of-view image generation section 20 as the target input images.

Further, the above-mentioned specific character strings and numerical values and specific character strings and numerical values in the accompanying drawings are illustrative and not restrictive, and the present invention is not limited to such character strings and numerical values.

The invention claimed is:

1. A learning apparatus comprising:
an input image acquisition section that acquires a plurality of input images that individually depict a state imaged at a predetermined angle of view in a predetermined relative imaging direction;
a wide angle-of-view image acquisition section that acquires a wide angle-of-view image having an angle of view including all the angles of view of the plurality of input images; and
a learning section that performs learning of a wide angle-of-view image generation section based on the wide angle-of-view image and an output that is generated when the plurality of input images are inputted to the wide angle-of-view image generation section, the wide angle-of-view image generation section being adapted to generate and output an image having an angle of view including all the angles of view of a plurality of images in response to the input of the plurality of images.

2. The learning apparatus according to claim 1, further comprising:
an input image generation section that generates the plurality of input images based on the wide angle-of-view image,
wherein the input image acquisition section acquires the plurality of input images generated by the input image generation section.

3. The learning apparatus according to claim 2,
wherein the input image generation section generates a plurality of combinations of the plurality of input images depicting different locations, based on the wide angle-of-view image, within the wide angle-of-view image,
the input image generation section generates the wide angle-of-view image associated with each of the combinations based on the wide angle-of-view image, and
the learning section uses the generated plurality of combinations to perform the learning of the wide angle-of-view image generation section based on the plurality of input images belonging to a relevant combination and the wide angle-of-view image associated with the relevant combination.

4. An image generation apparatus comprising:
an input image acquisition section that acquires a plurality of input images that are individually captured by a plurality of cameras included in an imaging apparatus at a predetermined angle of view in a predetermined relative imaging direction; and
a wide angle-of-view image generation section that generates and outputs an image having an angle of view including all the angles of view of the plurality of input images in response to the input of the plurality of input images,
wherein the wide angle-of-view image generation section is a machine learning model learned based on an image and an output that is generated when a plurality of images individually including a part of the angle of view of the image are inputted to the wide angle-of-view image generation section.

5. The image generation apparatus according to claim 4, wherein the plurality of cameras are mounted on different surfaces of the imaging apparatus.

6. A learning method comprising:
acquiring a plurality of input images that individually depict a state imaged at a predetermined angle of view in a predetermined relative imaging direction;
acquiring a wide angle-of-view image having an angle of view including all the angles of view of the plurality of input images; and
performing learning of a wide angle-of-view image generation section based on the wide angle-of-view image and an output that is generated when the plurality of input images are inputted to the wide angle-of-view image generation section, the wide angle-of-view image generation section being adapted to generate and output an image having an angle of view including all the angles of view of a plurality of images in response to the input of the plurality of images.

7. An image generation method comprising:
acquiring a plurality of input images that are individually captured by a plurality of cameras included in an imaging apparatus at a predetermined angle of view in a predetermined relative imaging direction; and
causing a wide angle-of-view image generation section to generate and output an image having an angle of view including all the angles of view of the plurality of input images by inputting the plurality of input images to the wide angle-of-view image generation section, the wide angle-of-view image generation section being a machine learning model learned based on an image and an output that is generated when a plurality of images individually including a part of the angle of view of the image are inputted.

8. A non-transitory, computer readable storage medium containing a computer program, which when executed by a computer, causes the computer to perform a learning method by carrying out actions, comprising:
acquiring a plurality of input images that individually depict a state imaged at a predetermined angle of view in a predetermined relative imaging direction;
acquiring a wide angle-of-view image having an angle of view including all the angles of view of the plurality of input images; and
performing learning of a wide angle-of-view image generation section based on the wide angle-of-view image and an output that is generated when the plurality of input images are inputted to the wide angle-of-view image generation section, the wide angle-of-view image generation section being adapted to generate and output an image having an angle of view including all the angles of view of a plurality of images in response to the input of the plurality of images.

9. A non-transitory, computer readable storage medium containing a computer program, which when executed by a computer, causes the computer to perform an image generation method by carrying out actions, comprising:
acquiring a plurality of input images that are individually captured by a plurality of cameras included in an imaging apparatus at a predetermined angle of view in a predetermined relative imaging direction; and
causing a wide angle-of-view image generation section to generate and output an image having an angle of view including all the angles of view of the plurality of input images by inputting the plurality of input images to the wide angle-of-view image generation section, the wide angle-of-view image generation section being a machine learning model learned based on an image and an output that is generated when a plurality of images individually including a part of the angle of view of the image are inputted.

* * * * *